US006145565A

United States Patent [19]

Fromson et al.

[11] Patent Number: 6,145,565

[45] Date of Patent: Nov. 14, 2000

[54] LASER IMAGEABLE PRINTING PLATE AND SUBSTRATE THEREFOR

[76] Inventors: Howard A. Fromson, 49 Main St., Stonington, Conn. 06378; William J. Rozell, 608 Bolton Rd., Vernon, Conn. 06066; Robert F. Gracia, 270 Old Turnpike Rd., Woodstock Valley, Conn. 06282

[21] Appl. No.: 09/079,735

[22] Filed: May 15, 1998

Related U.S. Application Data

[63] Continuation-in-part of application No. 09/019,829, Feb. 6, 1998.

[60] Provisional application No. 60/047,447, May 22, 1997.

[51] Int. Cl.[7] .................................................... B23K 37/00

[52] U.S. Cl. .......................... 156/580; 156/665; 427/307; 427/309; 427/318; 101/457; 101/451; 101/463.1; 101/459; 101/454; 101/453; 430/302; 430/301; 430/944

[58] Field of Search .................................... 427/307, 309, 427/318, 444; 101/457, 451, 463.1, 462, 454, 453, 459; 156/580, 665; 430/302, 944, 778.1, 301, 167, 157; 428/195

[56] References Cited

U.S. PATENT DOCUMENTS

| | | |
|---|---|---|
| 3,181,461 | 5/1965 | Fromson . |
| 4,063,949 | 12/1977 | Uhlig et al. . |
| 4,063,964 | 12/1977 | Uhlig et al. . |
| 4,277,555 | 7/1981 | Fromson et al. . |
| 4,427,500 | 1/1984 | Platzer . |
| 4,501,810 | 2/1985 | Fromson et al. . |
| 4,554,057 | 11/1985 | Mohr . |
| 4,555,475 | 11/1985 | Gamson et al. . |
| 4,731,317 | 3/1988 | Fromson et al. . |
| 4,833,486 | 5/1989 | Zerillo . |
| 5,250,393 | 10/1993 | Imai et al. . |
| 5,339,737 | 8/1994 | Lewis et al. . |
| 5,353,705 | 10/1994 | Lewis et al. . |
| 5,379,698 | 1/1995 | Nowak et al. . |
| 5,385,092 | 1/1995 | Lewis et al. . |
| 5,487,338 | 1/1996 | Lewis et al. . |
| 5,493,971 | 2/1996 | Lewis et al. . |
| 5,540,150 | 7/1996 | Lewis et al. . |
| 5,551,341 | 9/1996 | Lewis et al. . |
| 5,641,608 | 6/1997 | Grunwald et al. . |
| 5,691,114 | 11/1997 | Burberry et al. . |

*Primary Examiner*—Merrick Dixon
*Attorney, Agent, or Firm*—Fulbright & Jaworski, LLP

[57] ABSTRACT

A metal substrate is treated with a plurality of rotating brushes and a slurry of particulate material such that the treated surface is capable of absorbing incident infrared laser radiation. The substrate is itself capable of being visibly imaged by selective writing with an infrared laser. The substrate is coated with an ablatable coating which is transparent to the imaging infrared laser radiation. Selective exposure to infrared laser radiation ablates this coating in the laser exposed areas as a result of the absorption of infrared radiation by the substrate. The substrate can be anodized after rotary brush graining and still retain its ability to be imaged and ablate a coating. The coated article can be imaged in a computer-to-plate infrared laser imaging device. Depending on the specific coating and substrate selection, the imaged article can be used in a conventional lithographic printing process or in a dryographic printing process.

52 Claims, 2 Drawing Sheets

FIG. 1
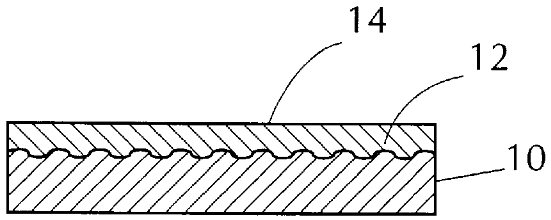
FIG. 2
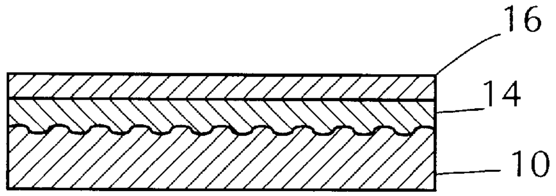
FIG. 3
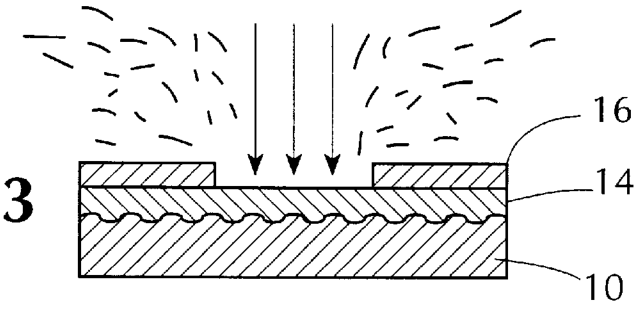
FIG. 4
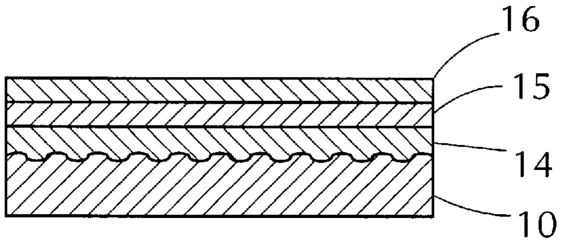
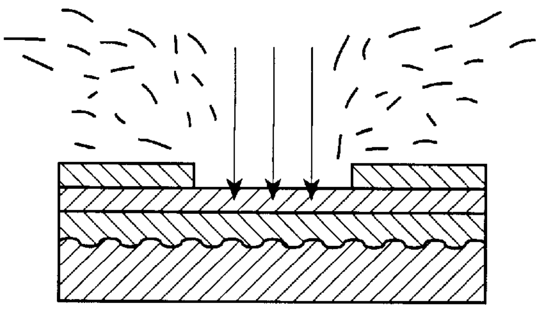
FIG. 5

1 Pass SEM (100,000X)

2 Pass SEM (100,000X)

3 Pass SEM (100,000X)

LASER IMAGEABLE PRINTING PLATE AND SUBSTRATE THEREFOR

This is a continuation-in-part application Ser. No. 09/019,829 filed Feb. 6, 1998, which is a continuation-in-part of copending provisional application Ser. No. 60/047,447 filed May 22, 1997, all of which are hereby incorporated by reference.

The invention relates to an imageable metal substrate, in particular to a coated planer substrate which can be laser imaged to form a printing plate.

BACKGROUND

Conventional lithographic printing plates, such as those typically used by both newspaper and commercial printers, are usually made of grained, anodized aluminum substrate which has been coated with a light sensitive coating. The grained, anodized aluminum is generally post treated to enhance hydrophilicity of the substrate sheet prior to the application of the light sensitive coating. Solutions which are useful for post treatment include, for example, sodium silicate and polyvinylphosphonic acid.

Graining of aluminum is accomplished in a variety of ways, including rotary brush graining, chemical graining and electrochemical graining. It is possible to use more than one of these techniques in the production of lithographic substrate. A grained surface has better adhesion to light sensitive coatings and carries fountain solution in the background areas of the plate on the press more efficiently than the ungrained surface.

Anodizing is the process of electrolytically generating aluminum oxide on the surface of the aluminum sheet. Commonly used anodizing electrolytes include sulfuric acid and phosphoric acid. Since anodic aluminum oxide is harder and more abrasion resistant than aluminum, an anodized printing plate has a greater press life than a bare plate.

Computer-to-plate systems using infrared lasers are now available for imaging printing plates. By imaging directly on the plate, the use of photographic negatives is eliminated.

U.S. Pat. No. 4,731,317 to Fromson et. al. discloses a printing plate based on a substrate which is brush grained in a slurry comprising alumina, followed by successive treatments in dilute sodium hydroxide and nitric acid, and subsequent anodizing to achieve an oxide coating weight of 1.5 milligrams per square inch. The substrate may also be silicated after anodizing to improve hydrophilicity in accordance with U.S. Pat. No. 3,181,461. The anodized plate is coated with a diazo resin which is transparent to the radiation of a YAG infrared laser (1064 nanometers), but is sensitive to the longer wavelengths generated within the areas of the anodic oxide exposed to the laser. The theory is that the grained surface traps the laser radiation and re-emits the energy as longer wavelengths. This light trapping property must be enhanced by the addition of carbon black to the diazo. The diazo is rendered insoluble where the plate is exposed to the laser. Following laser exposure, the unexposed diazo is removed with a solvent to reveal hydrophilic oxide in the background. Because the non-imaged areas are removed with a solvent, the plate is described as negative working.

U.S. Pat. No. 4,731,317 mentions that the diazo may partially ablate when the level of the laser radiation is relatively high. Such ablation is undesirable since the areas exposed to the laser radiation are to remain on the plate as the ink bearing image after processing in the developing solution.

SUMMARY OF THE INVENTION

According to the present invention, a planar or curved metal substrate is treated such that the surface is capable of being visibly imaged by selective writing with an infrared laser. A preferred treatment for this purpose is rotary brush graining. The phrase "rotary brush graining" is intended to refer to any process using axially rotating brushes that tangentially contact a surface to be grained in the presence of a slurry containing particulate material such as alumina, silica and the like. The phrase also includes equivalent processes that produce the same result.

The treated surface is coated with an ablatable coating which is transparent to imaging infrared laser radiation. Selective exposure to infrared laser radiation ablates this coating in the laser exposed areas as a result of the absorption of infrared radiation by the treated metal surface. The coated substrate can be imaged in a computer-to-plate infrared laser imaging device. Depending on the specific coating and substrate selection, the imaged substrate can be used in a conventional lithographic printing process or in a dryographic printing process.

The printing plate of the invention thus comprises a metal substrate with a laser ablatable coating thereon wherein the substrate itself can be imaged with a laser.

The preferred metal substrate is aluminum which is preferably anodized after being treated to render the substrate imageable by an infrared laser. Anodized aluminum may optionally be post treated with sodium silicate, polyvinylphosphonic acid or the like to enhance the hydrophilic nature of the non-image areas.

The ablatable coating itself does not absorb ablative infrared laser radiation, since it is transparent to it. The imaging infrared laser radiation passes through the coating and is absorbed by the treated metal substrate. The coating in the laser imaged areas ablates as a result of the incident infrared energy captured by the treated metal substrate. The coating in the areas not exposed to the imaging laser radiation remains adhered to the plate.

The substrate of the invention serves three functions. First, it carries an ablatable coating. Secondly it is capable of absorbing infrared laser radiation to ablate the coating. Lastly, it becomes the printing plate wherein the laser ablated areas function as the image or the background depending on the choice of coating and the mode of printing. i.e. lithographic or dryographic. Because the substrate itself causes laser ablation of the coating, which functions as the image or background after laser imaging, no intermediate layer or coating is required to promote or cause ablation to take place.

In a further embodiment, the ablatable coating is positive acting with respect to imaging by ultraviolet radiation. The infrared laser ablated (imaged) plate is blanket exposed to ultraviolet light to an extent sufficient to solubilize the ablation debris left behind in the background area without substantially affecting the image on the plate.

BRIEF DESCRIPTION OF THE DRAWINGS

FIG. 1 is a cross-section of a metal substrate useful in the invention;

FIG. 2 is a cross-section of a printing plate according to the invention;

FIG. 3 is a cross-section depicting laser ablation of the top coating;

FIG. 4 is a cross-section of a printing plate with a subcoating;

FIG. 5 is a cross-section depicting laser ablation of the top coating of the plate of FIG. 4.

DESCRIPTION

It has been discovered that sufficient treatment of a metal substrate by rotary brush graining produces a surface which can be visibly imaged by selective exposure to infrared laser radiation.

It has further been discovered that when the treated substrate is coated with an ablatable coating and selectively exposed to infrared laser radiation, the coating is selectively ablated in the laser exposed areas.

Figure 6A:
FIGS. 6A–C are SEMS of surfaces 1P, 2P and 3P at 100,000× magnification
Figure 6B:
Figure 6C:
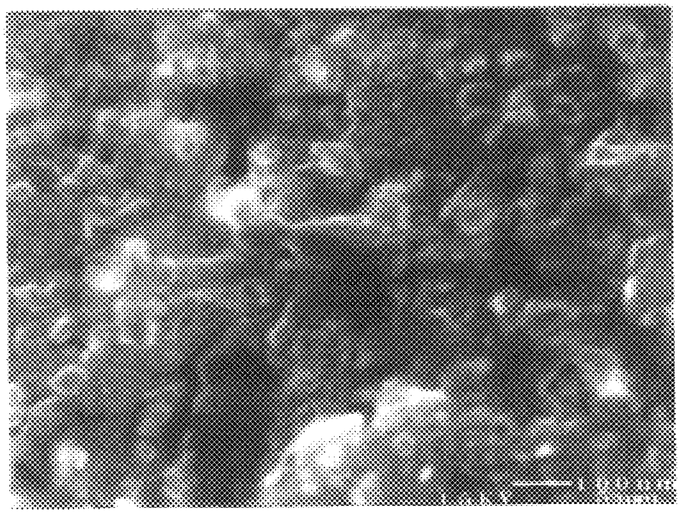

The amount of rotary brush graining required to impart the ability to be imaged by an infrared laser can be determined empirically. For example, three samples were prepared representing different degrees of rotary brush graining. The same brush graining unit and brushes were used for each sample. The brush graining stand contained eight brushes, each 14 inches in diameter. The brush filaments were 2 inch long nylon. The brushes were rotated axially at 750 rpm. The slurry contained 33% unfused platy alumina. An aluminum web was passed through the brush graining unit at a rate of 80 feet per minute. A sample was removed and identified as 1P (one pass). The already grained web was passed through the brush graining unit at the same rate of 80 feet per minute a second time. A sample was removed and identified as 2P (two pass). The twice grained aluminum web was again passed through the brush graining unit at the same rate for a third time. A final sample was removed and identified as 3P (three pass). FIGS. 6A–C are SEMs of the 1P, 2P and 3P surfaces at a 100,000× magnification.

All three plate samples were subjected to infrared laser imaging on a Gerber Crescent 42T Plate Image Setter manufactured by Gerber Scientific of South Windsor, Conn. The imaging conditions were the same for each sample. Sample 1P had an image which was barely visible. Sample 2P had move visible image, but the contrast was still rather weak. Sample 3P had a strong vivid image. Although the three samples were found to have similar topographies as characterized by conventional stylus profiling and roughness measurement techniques, the ability to be imaged by the laser is significantly different for the samples.

While not being bound by any particular theory, it appears that extensive embedment of particles during the graining process gives rise to the unique character of the imageable surface. Rotary brush graining results in a surface where multiple particles (e.g., calcined alumina) become embedded within the surface of the sheet, with most being covered over by a skin of the metal as a result of the extensive roughening. The particles have a low thermal conductivity relative to the metal. Thus, hard (relative to the metal substrate) particles with low thermal conductivity, especially hard metal oxide particles, are preferred for use in the present invention. These embedded particles within the metal matrix make for a very circuitous and thus less efficient path for heat dissipation. The energy captured at the surface cannot be transferred efficiently to the substrate via the thin cross sections by which thermal continuity to the bulk of the substrate metal sheet is maintained. This results in a temperature rise at the surface of the grained metal sheet which is sufficient to cause some amount of localized melting of the aluminum within the surface.

While rotary brush graining has been shown to be an efficient method for producing these surfaces, other equivalent methods such as high pressure rolling, grit blasting, ball graining, or the like, which give rise to a metal surface with a relatively high degree of embedded particulate material may also be used.

Not all graining methods are suitable for producing a surface which can be imaged with an infrared laser. For example, graining techniques that do not embed particles such as chemical or electrochemical graining, known to produce suitable lithographic surfaces, do not produce a surface which is imageable by an infrared laser. However, these techniques can be employed for special purposes provided the substrate is subsequently rotary brush grained.

Rotary brush graining typically increases surface roughness. However, the present invention does not require that roughness of the substrate be increased in order to make it laser imageable. For example, it is possible to emboss or electrochemically grain a substrate to produce a coarsely roughened surface, which itself it not laser imageable. Rotary brush graining as described herein will render the substrate laser imageable and may also reduce surface roughness as measured, for example, by a stylus type profiling instrument. Similarly, blasting with very fine particles might reduce the surface roughness of a substrate having a more coarse initial topography. The present invention requires a treatment which renders the substrate imageable with an infrared laser, but the surface roughness may be increased or decreased as a result of rotary brush graining or equivalent treatment as described herein.

Subsequent to the brush graining process, treatment with harsh chemicals may cause the surface to lose it's ability to be imaged by lasers. For example, etching with sodium hydroxide, as disclosed in U.S. Pat. No. 4,731,317 alters the surface such that it cannot be so imaged. Additionally, excessive anodizing in electrolytes such as sulfuric acid or phosphoric acid can alter the surface so that it is no longer imageable. It is believed that these types of treatments remove the embedded particles and thus alter the efficiency with which the thermal energy is conducted from the surface into the substrate sheet.

It is possible to anodize the brush grained surface and retain the ability to image the surface with infrared lasers. Anodizing in sulfuric acid at low temperatures with relatively low oxide coating weights is effective in producing a surface which can be laser imaged and yet have the hardness and durability needed for printing. An anodic oxide thickness of about one micron or less, preferably about 0.5 microns, is most suitable.

Although aluminum is the preferred substrate, other metals can be rotary brush grained according to the present invention, coated with an ablatable coating, and selectively imaged with an infrared laser such that the coating is ablated in the laser written areas. Suitable metals include zinc, tin, iron, steel and alloys thereof. Laminates of metals can also be used such as tin, zinc, lead and alloys thereof clad or plated onto steel. A rotary brush grained steel surface will absorb infrared laser radiation to selectively ablate a coating as described herein but is not itself imaged as is the case with aluminum and other metals.

In a preferred embodiment, the substrate is prepared on a continuous coil anodizing line. The aluminum web is first subjected to a cleaning or degreasing process to remove milling oil residue from the surface. These processes are well known in the art of preparing aluminum surfaces for subsequent anodization. The aluminum web is rinsed in water after the cleaning step. It is next subjected to a rotary brush graining process using a series of axially rotating brushes that tangentially contact the web in the presence of a slurry comprising unfused platy alumina having a particle size of from 2 to 5 microns up to about 10 microns. As described previously, three passes through an eight brush grainer unit at 80 feet per minute results in a surface which can be laser imaged or can cause an ablatable coating to be ablated from the surface. An equivalent result can be obtained either by a single pass through the eight brush grainer at a throughput speed of approximately 27 feet per minute, or by a single pass through a 24 brush grainer at 80 feet per minute. Although subsequent anodizing is preferred, the as-grained aluminum surface itself is also imageable and can cause a coating thereon to ablate when imaged by an infrared laser. A useful method for graining is as taught in U.S. Pat. No. 4,183,788 to Fromson.

After graining, the aluminum web is rinsed in water and anodized by methods well understood in the art. Referring to FIG. 1, the aluminum web 10 has a roughened surface 12 and an anodic oxide layer 14. The electrolyte can be, for example, sulfuric acid or phosphoric acid. Sulfuric acid is preferred since it allows for oxide formation at lower dissolution rates. The anodizing is further preferentially carried out at relatively lower temperatures to further minimize the redissolution of the anodic oxide coating with the added benefit of producing a harder oxide layer than anodizing processes at higher electrolyte temperatures. Preferred oxide coating weights are in the range of 0.1 to 3.0 milligrams per square inch, more preferably from about 0.2 to 0.8 milligrams per square inch. U.S. Pat. No. Re 29,754 to Fromson discloses a preferred method for anodizing.

It has been found that coatings comprising certain phenolic polymers or silicone resins can be ablated according to the present invention. The ablation of the coating seems to occur without any evidence of burning, charring or any change other than that it is converted to a fine dust or residue. However, the invention is not limited to these two classes of coatings. Other ablatable coatings can be determined empirically.

The ablatable coating can be non-light sensitive, such as phenylmethylsiloxanes, or light sensitive, such as positive active coatings based on phenolic resins. Such positive acting coatings are well known in the art and have been found to readily ablate with an infrared laser when applied to a substrate of the present invention. The laser removes background areas leaving the phenylmethylsiloxane or phenolic resin in the areas where the plate was not laser imaged.

Positive acting coatings can also be used with a second top coating which is transparent to infrared laser radiation but may or may not itself be ablatable from the substrate of the invention. Thus, if it is desired to present a special surface for a particular application which can only be provided by a non-ablatable coating, an ablatable undercoating on the substrate with a top coating of the non-ablatable coating will enable selective laser ablation of both layers.

For example in waterless or dryographic printing, the background must be low in surface energy so as to repel the printing fluid which is carried by the image areas of the plate. Cross-linked polysiloxane polymers such as described in Example 12 and 13 herein have a sufficiently low surface energy to be used as the non-image or background of a dryographic plate but cannot be ablated from the substrate of the invention. Top coating a cross-linked polysiloxane coating onto an ablatable positive working coating on the substrate enables laser ablation of both coatings simultaneously from image areas on the substrate. Thus, a positive working coating is used to form a negative working plate and is the means by which an otherwise non-ablatable coating can be selectively removed from the substrate of the invention.

Phenolic resins are known to be useful as the image forming area on a printing plate, and can further be heat-set to provide a durable image capable of very long press runs. Examples of phenolic resins useful in the practice of this invention, such as Novolac or resole resins, are described in Chapter XV of "Synthetic Resins in Coatings," H. P. Preuss, Noyes Development Corporation (1965), Pearl River, N.Y.

The ablatable coating should be as thin as possible but still adequately cover the substrate to provide a durable image for printing. Coating weights in the range of about 50 to about 500 milligrams per square foot can be used, but it is preferable to work in the range of about 100 to 200 milligrams per square foot. Thicker coatings require more time and energy to ablate. This is an important factor in newspaper publishing industry, where large numbers of plates must be prepared within a tight time constraint. Reducing the coating weight from 200 milligrams per square foot to 150 milligrams per square foot can result in a reduction in laser exposure time of about 15%. A second top coating, when used, is preferably about the same thickness as the ablatable coating.

When using a positive working light sensitive phenolic resin coating, it is preferred, after ablation, to blanket expose the laser imaged plate with ultraviolet light sufficient to solubilize any coating residue which remains in the background. This alleviates any undesirable ink pick-up in the non-image areas of the plate on press. A short exposure of about 25 millijoules per square centimeter will solubilize any resin in the background, which is then removed, for example, with an alkaline cleaning solution. This blanket exposure represents about 8 to 10% of the total energy normally used to expose a positive resin. A thin skin of the resin coating will also be removed from the image area, but these losses are on the order of 4% and are tolerable. The coating still retains it's integrity in the printing process. Laser imaging systems use infrared YAG lasers operating at powers up to 15 watts. Gerber Scientific of South Windsor, Connecticut and Scan Graphics of Wedel, Germany supply commercial computer-to-plate systems which can be used to image plates prepared according to the present invention.

The following examples are illustrative without being limiting.

EXAMPLE 1A

Several samples and two comparative samples were prepared from an Alcoa 3103-H26 alloy aluminum coil. The coil was rotary bush grained and anodized varying conditions set forth in the following table. All samples except for T-30 are anodized in 25% sulfuric acid. T-30 was anodized in a 2% tartaric acid solution.

TABLE 1

| Sample | Graining | Anodizing | Volts | Amp/sq.in | Oxide Wt. mg/sq.in |
|---|---|---|---|---|---|
| EX-140 | 3.5 sec. | 50 sec. | 40 | 1.05 | 2.8 |
| EX-147 | 3.5 sec. | 50 sec. | 15 | .17 | .51 |
| EX-148 | 3.5 sec. | 25 sec. | 14 | .19 | .29 |
| T-30 | 3.5 sec. | 30 sec. | 50 | .07 | .275 |
| EX-113 | 2.3 sec. | 31 sec. | 29 | .71 | 1.27 |
| Delta | 1.5 sec. | 20 sec. | 36 | .91 | 1.29 |

All samples were placed in a Gerber Crescent 42T Plate Image Setter and exposed image wise with the YAG laser at 9, 7 and 5 watts. After exposure a permanent visible image was created in samples EX 140, 147, 148 and T-30 at all power levels.

Samples EX-113 and Delta are comparative examples which have been etched in sodium hydroxide solution and desmutted in nitric acid solution prior to anodization. The etching destroys the ability of these samples to be imaged.

EXAMPLE 1

A 12.5% solution of Dow Corning Silicone Resin 6-2230 in PM acetate was applied to three separate samples of anodized substrate Ex-140 from Table 1 at three different coat weights; 100 mg/sq. ft., 150 mg/sq. ft. and 200 mg/sq. ft. respectively. The coatings were oven dried at 90° C. for two minutes, to yield a layer of silicone 14 as depicted in FIG. 2. The anodic coat weight was 2.8 mg/in$^2$. The thus prepared single coated aluminum plate was then mounted in a Gerber Crescent 42T Plate Image Setter which has an internal drum configuration. It was equipped with a 10 watt, 1064 nm YAG laser made by Light Wave Inc. The coated plate samples were imaged at 150 Hz, with a spot size of 10 microns, and a dwell time of 36 nanoseconds, at power levels of 10, 9 and 7 watts. FIG. 3 depicts the ablation process, the silicone 16 being selectively ablated to expose the oxide layer 14.

The 200 mg/sq. ft. silicone coating ablated cleanly at 10 watts, partially ablated at 9 watts, and did not ablate at 7 watts.

The 150 mg/sq. ft. silicone coating ablated cleanly at 10 and 9 watts, and only partially ablated at 7 watts.

The 100 mg/sq. ft. silicone coating ablated cleanly at 10, 9 and 7 watts.

It is obvious from the results that thicker coatings (higher coating weights) need more laser power to ablate cleanly, and conversely, thinner coatings need less laser power to ablate cleanly.

EXAMPLE 2

A series of Dow Coming resins based on polymethylphenyl siloxane was prepared as in Example 1. The resins are designated as Dow Corning Resins 1-0543, 6018, 840, 804, and 806A. These resins vary in the percentage of phenyl substitution and molecular weight; all are film formers at room temperature. These resins were applied to anodized substrate EX-140 from Table 1. The coat weight was 150 mg/sq.ft. for all samples. The silicone coated plate samples thus prepared were imaged at 9 watts on the Gerber Crescent 42T Plate Image Setter. All samples ablated cleanly.

EXAMPLE 3

A brush grained and anodized aluminum substrate was prepared similar to Example 1, except that the anodic film coat weight was 0.5 mg/sq. in.(sample EX-147, Table 1). The aluminum sample was then coated with Dow Coming Resin 6-2230 at 150 mg/sq.ft. The single coated aluminum plate was placed in the Gerber Crescent 42T Plate Image Setter and imaged with 1064 nm YAG Laser at 9 watts (150 mj/sq. cm. at the plate surface). The silicone coating ablated cleanly with little, if any, visible residue in the ablated area.

EXAMPLE 4

Two brush grained and anodized aluminum substrates (EX-140 and EX-147 from Table 1) were used. The uncoated aluminum plates were placed in the Gerber Crescent 42T Plate Image Setter and exposed image wise with the YAG laser at 9, 7 and 5 watts. After exposure a permanent visible image was left on the brushed grained anodized aluminum surface. The change caused by the YAG laser produced enough contrast so that a visible image could be detected down to 5 watts.

EXAMPLE 5

An aluminum substrate was prepared as in Example 3 except that a post treatment of polyvinylphophonic acid was applied to the brush grained anodized surface. The thus prepared substrate was coated with a solution of Dow Coming Silicone Resin 6-2230 at a coat weight of 150 mg/sq.ft. The plate was imaged with a YAG laser at 9 watts as in Example 1. The imaged areas were ablated clean with little or no residue.

EXAMPLE 6

A brush grained anodized aluminum substrate was prepared as in Example 3. A subcoat of gum arabic (3.5%) was applied with a #1 Meyer applicator rod. Referring to FIG. 4, this subcoating 15 appears between the oxide 14 topcoat 16. The coating was dried in the oven at 90° C. for 1 minute. A coat weight of 10 mg/sq.ft. was determined gravimetrically. A second coating (topcoat) of Dow Coming 6-2230 applied at 150 mg/sq.ft. was coated over the subcoating and dried at 90° C. for 2 minutes. The brush grained anodized coated plate, as described, was placed in the Gerber Crescent 42T Plate Image Setter. The plate was imaged (background) with the 1064 nm, YAG Laser at 9 watts of power. The resulting ablation produced a clean, clear image of a standard GATF qualify controlled target. This quality controlled target contained 200 lpi half tones, 0.5% highlight dots, and 99.5% shadow dots, along with a 1 pixel positive and negative concentric circle targets. The imaged plate was placed in a Ryobi Duplicator Press without a developing step. 200 clean copies showing perfect resolution of all imagery, including the 1 pixel positive and negative circle, were produced.

EXAMPLE 7

The following positive-acting, light sensitive coating formulation was prepared:

| | |
|---|---|
| Arcosolve PM | 42.86% |
| Ethanol | 21.34% |
| 1,1-Napthoquinone diazide [2]-5-sulfonyloxy P-cresol resin | 9.26% |
| Cresol resin | 20.70% |
| t-Butylphenolformaldehyde resin | 0.36% |
| Phenolformaldehyde resin | 4.76% |
| Blue dye | 0.76% |
| BYK 344 | 0.08% |

The above coating was applied to an anodized aluminum substrate (EX-147, Table 1) at a dry coating weight of 140 mg/sq ft. The thus prepared plate was imaged on a Gerber Crescent 42T Plate Image Setter at a laser power of 6.5 watts. The coating was ablated in the areas where the laser had imaged the anodized aluminum substrate. The plate was developed with a commercially available Fuji DP-4 developer at a dilution of 1 part developer to 8 parts water. After development, the areas of the plate which had been imaged by the laser were free of coating, while the non-laser written areas of the plate retained the coating.

COMPARATIVE EXAMPLE 8

The coating formulation of Example 7 was applied to an anodized aluminum substrate (Delta, Table 1) at a dry coating weight of 140 mg/sq ft. The thus prepared plate was imaged in the same manner as in Example 7. In this case there was no observed ablation of the coating in the areas where the laser had impinged on the plate surface. When developed in the same way as the plate in Example 7, there was no removal of the coating in the laser written areas of the plate; the entire plate remained uniformly coated.

EXAMPLE 9

An aluminum substrate was degreased, brush grained, and anodized in web form. The graining was accomplished by three passes through a series of eight cylindrical nylon brushes rotating at 750 RPM. The speed of the web was 80 ft./min. The graining medium was unfused aluminum oxide (calcined alumina) After graining, the web was anodized in sulfuric acid to an oxide coat weight of 0.5 mg/sq. in, rinsed, dried, and recoiled. The grained and anodized coil was then placed on a coil coating line equipped with an extrusion coating head. The positive working, UV sensitive coating of Example 7 was applied at a coating weight of 200 mg/sq. ft.

The coated product was cut into single page plates sized to accommodate a Goss Community Press and placed in a Gerber Crescent 42T Plate Image Setter equipped with a 10 watt YAG Laser that delivered 7 watts of power to the plate surface. A newspaper data file containing the digital data required to produce a set of four color separations necessary to print a color advertisement was used. The laser scanned the plates at 150 Hz, 2540 dpi, with spot size of 12 microns. Scanning was done in the positive mode i.e. the background was removed.

The imaged plates were developed in a modified positive processor set at 5 ft/min. The modification consisted of a rinse/brush section followed by a UV exposure of 25 $mj/cm^2$ prior to entering the positive processor. The positive processor's developing station contained a standard developer consisting of an alkali metal silicate and sodium hydroxide. The pH was approximately 12.5. The plates were rinsed and dried.

The processed plates were placed on a four-color Goss Community Press located at a commercial newspaper facility. One hundred twenty-five thousand color prints of excellent quality were produced.

EXAMPLE 10

Two rotary brush grained samples were prepared for each of the following planar metal sheet types:

Terne (Pb/Sn alloy) coated steel

Mild carbon steel

Galvanized steel

Tin plated steel

Zinc

For each sample graining was accomplished by a single pass through a series of eight cylindrical nylon brushes rotating at 750 rpm. The speed through the grainer was 12 feet/minute. The graining slurry contained unfused aluminum oxide (calcined alumina).

One of the roughened samples of each type was then coated via a Meyer applicator rod with a light sensitive positive working coating applied at a coat weight of 200 milligrams per square foot. The coating was the same positive-acting, light sensitive coating as in Example 7.

The coated and uncoated roughened sheets were then imaged on a Gerber Crescent 42T Plate Imager Thermal as in Example 9. The coated, imaged samples were developed as in Example 9. All coated plates ablated with good resolution. All uncoated roughened samples, with the exception of the mild carbon steel, showed evidence of a visible image at a low contrast as a result of the selective writing by the laser.

EXAMPLE 11

An aluminum substrate was degreased, brush grained and anodized in web form. The graining was accomplished by a single pass through a series of eight cylindrical nylon brushes rotating at 750 rpm. The speed of the web was 23 feet/minute. The graining medium was unfused aluminum oxide (calcined alumina). After graining, the web was anodized in sulfuric acid to an oxide coat weight of 0.5 milligrams per square inch, rinsed, dried, and recoiled.

A sample of this aluminum web was subsequently vacuum metallized with aluminum to a coating thickness of approximately 600 Angstroms. The thus metallized surface had a relatively reflective visual appearance. The sample was imaged in a Gerber Crescent 42T Plate Imager Thermal as in Example 9. An image was formed as a result of the selective writing by the laser. In the areas where the laser had struck the plate, the reflective visual appearance of the metallized layer had been lost, and the darker underlying oxide layer was revealed.

EXAMPLE 12

A rotary brush grained, anodized aluminum substrate was prepared as in Example 11 and coated with a positive acting coating as in Example 7.

A second coating of a polysiloxane cross-linked polymer (formulation below) was applied over the positive acting coating at a coating weight of 150–200 $mg/ft^2$ and oven dried at 150° C. for 2 minutes.

| Coating Formulation | Grams |
|---|---|
| PS185 (United Chem Tech) | 5.0 |
| PC-072 (United Chem Tech) | 0.05 |
| PS123 (United Chem Tech) | 0.15 |
| Methyl Pentynol | 0.05 |
| Hexane | 24.75 |

The twice coated plates were placed in a Gerber Crescent 42T Plate Image Setter equipped with a 10 watt YAG laser. The plates were scanned at 150 Hz, 2540 dpi, with a spot size of 10 microns. After scanning it was observed that both coatings in the areas exposed to the laser bean had been ablated. Gentle rubbing with a soft brush or cloth easily removed the ablated residue. In this embodiment, the positive acting coating is directly ablated from the plate surface which also removes the corresponding area of the overlying cross-linked polymer.

The ablated plates are placed on a Heidelberg waterless, dryographic, direct image press which prints with a hi-tack ink. The unablated areas of the plate present an ink-repelling polysiloxane surface while the image is transferred from those areas of the plate exposed by laser ablation. Thus, a positive active coating is used to make a negative working plate for dryographic printing.

EXAMPLE 13

Example 12 was repeated using the following polysiloxane as the second coating:

| Coating Formulation | Grams |
|---|---|
| SFR750 (PPG) | 7.5 |
| SF201 (PPG) | 3.5 |
| XL-1 (PPG) | 5.0 |
| 2-7131 (Dow Corning) | 0.5 |
| Dibutyltin Dilaurate | 2.0 |
| Acetic Acid | 3.5 |
| Hexane | 28.0 |

The twice coated plates were placed in a Gerber Crescent 42T Plate Image Setter equipped with a 10 watt YAG laser. The plates were scanned at 150 Hz, 2540 dpi, with a spot size of 10 microns. After scanning it was observed that both coatings in the areas exposed to the laser bean had been ablated. Gentle rubbing with a soft brush or cloth easily removed the ablated residue. In this embodiment, the positive acting coating is directly ablated from the plate surface which also removes the corresponding area of the overlying cross-linked polymer.

The ablated plates are placed on a Heidelberg waterless, dryographic, direct image press which prints with a hi-tack ink. The unablated areas of the plate present an ink-repelling polysiloxane surface while the image is transferred from those areas of the plate exposed by laser ablation. Thus, a positive active coating is used to make a negative working plate for dryographic printing.

What is claimed is:

1. Printing plate comprising (a) an anodically oxidized aluminum substrate which has been treated prior to anodizing such that the anodically oxidized substrate can be visibly imaged by selective exposure to an infrared laser; and (b) a coating which is transparent to infrared laser radiation on said substrate which coating can be ablated from said substrate when the substrate is struck by infrared laser radiation after passing through said laser transparent coating.

2. Printing plate of claim 1 wherein said substrate is rotary brush grained prior to anodizing.

3. Printing plate of claim 2 wherein anodic oxidation is carried out after brush graining without etching or other treatment before or during anodizing which would impair the ability of the substrate to be visibly imaged by selective exposure to an infrared laser.

4. Printing plate of claim 1 wherein said ablatable coating is present on said surface in an amount of 50–500 mg/sq. ft.

5. Printing plate of claim 1 wherein said coating is a silicone polymer.

6. Printing plate of claim 1 wherein said coating is oleophilic.

7. Printing plate of claim 1 wherein said coating comprises a positive-acting, light sensitive coating.

8. Printing plate of claim 7 suitable for dryograhic printing which includes an ink repelling second coating over said positive-acting coating.

9. Printing plate of claim 8 wherein said second coating is a non-ablatable silicone polymer.

10. Printing plate of claim 1 wherein said coating comprises a positive-acting, light sensitive phenolic coating.

11. Printing plate of claim 1 which includes a second coating which is transparent to infrared laser radiation over said coating.

12. Printing plate comprising (a) an aluminum substrate which has been treated such that the substrate can be visibly imaged by selective exposure to an infrared laser; and (b) a coating which is transparent to infrared laser radiation on said surface which coating can be ablated from said surface where the surface is struck by infrared laser radiation after passing through said laser transparent coating.

13. Printing plate of claim 12 wherein said substrate is rotary brush grained.

14. Printing plate of claim 12 wherein said ablatable coating is present on said surface in an amount of 50–500 mg/sq. ft.

15. Printing plate of claim 12 wherein said coating is a silicone polymer.

16. Printing plate of claim 12 wherein said coating is oleophilic.

17. Printing plate of claim 12 wherein said coating comprises a positive-acting, light sensitive coating.

18. Printing plate of claim 17 wherein said coating comprises a positive-acting, light sensitive phenolic coating.

19. Printing plate of claim 12 which includes a second coating which is transparent to infrared laser radiation over said coating.

20. Printing plate of claim 12 suitable for dryographic printing which includes an ink repelling second coating over coating.

21. Printing plate of claim 20 wherein said second coating is a non-ablatable silicone polymer.

22. Printing plate substrate comprising an aluminum substrate which can be visibly imaged by selective exposure to an infrared laser.

23. Printing plate substrate of claim 22 wherein said substrate is rotary brush grained.

24. Printing plate substrate comprising an anodically oxidized aluminum substrate which has been treated prior to anodizing such that the anodically oxidized substrate can be visibly imaged by selective exposure to an infrared laser.

25. Printing plate substrate of claim 24 wherein said substrate is rotary brush grained prior to anodizing.

26. Printing plate substrate of claim 24 wherein anodic oxidation is carried out after brush graining without etching or other treatment before or during anodizing which would impair the ability of the substrate to be visibly imaged by selective exposure to an infrared laser.

27. Printing plate comprising a metal substrate which has been treated such that the substrate can be visibly imaged by selective exposure to an infrared laser, said substrate having a coating transparent to infrared laser radiation which coating can be ablated from said substrate when the substrate is struck by infrared laser radiation after passing through said laser transparent coating.

28. Printing plate of claim 27 wherein said substrate is rotary brush grained.

29. Printing plate of claim 27 wherein said ablatable coating is present on said surface in an amount of 50–500 mg/sq. ft.

30. Printing plate of claim 27 wherein said coating is oleophilic.

31. Printing plate of claim 27 wherein said coating comprises a positive-acting, light sensitive phenolic coating.

32. Printing plate of claim 27 which includes a second coating which is transparent to infrared laser radiation over said coating.

33. Printing plate of claim 27 suitable for dryographic printing which includes an ink repelling second coating over said coating.

34. Printing plate of claim 33 wherein said second coating is a non-ablatable silicone polymer.

35. Printing plate of claim 27 wherein the metal substrate is selected from the group of aluminum, titanium, tin, zinc, lead, iron and alloys thereof.

36. Printing plate of claim 27 wherein the metal substrate is steel coated with a metal from the group of tin, zinc, lead and alloys thereof.

37. Printing plate of claim 27 wherein the metal substrate is anodically oxidized zinc, zinc coated steel or titanium.

38. Printing plate of claim 27 wherein said coating is a silicone polymer.

39. Printing plate of claim 27 wherein said coating comprises a positive-acting light sensitive coating.

40. Printing plate comprising a metal substrate having a coating transparent to infrared laser radiation, said substrate having been treated prior to coating such that said coating can be ablated from said substrate when the substrate is struck by infrared laser radiation after passing through said laser transparent coating.

41. Printing plate of claim 40 wherein the metal substrate is rotary brush grained.

42. Printing plate of claim 40 wherein the metal substrate is selected from the group of aluminum, titanium, tin, zinc, lead, iron, steel and alloys thereof.

43. Printing plate of claim 40 wherein the metal substrate is steel coated with a metal from the group of tin, zinc, lead and alloys thereof.

44. Printing member comprising a metal cylinder having a coating transparent to infrared laser radiation said cylinder having been treated prior to coating such that said coating can be ablated from said substrate when the substrate is struck by infrared laser radiation after passing through said laser transparent coating.

45. Printing plate of claim 1 wherein the anodically oxidized surface is vacuum metalized before coating.

46. Printing plate of claim 12 wherein the roughened surface is vacuum metalized before coating.

47. Printing plate of claim 27 wherein the substrate is vacuum metalized before coating.

48. Printing plate of claim 40 wherein the substrate is vacuum metalized before coating.

49. Bifunctional printing surface for a printing plate comprising a surface and an ablatable coating thereon, said coating being transparent to infrared laser radiation, said surface having been treated prior to coating so as to be capable of absorbing infrared laser radiation to ablate said coating after said laser radiation passes through said coating and presenting a surface where said coating is ablated which participates in printing.

50. Printing plate comprising (a) an aluminum substrate treated to embed particles within the surface thereof, said particles having a low thermal conductivity relative to aluminum and a hardness greater than aluminum;

(b) said substrate when selectively exposed to an infrared laser undergoing localized melting of aluminum within the surface of the substrate resulting in a visible image in said substrate;

(c) a coating which is transparent to infrared laser radiation on said substrate which coating can be ablated from said substrate when the substrate is struck by infrared laser radiation after passing through said laser transparent coating.

51. Printing plate of claim 50 wherein said particles are embedded by rotary brush graining said substrate.

52. Printing plate of claim 50 wherein the substrate is anodically oxidized after being treated to embed said particles.

* * * * *